(12) United States Patent
Cheng et al.

(10) Patent No.: US 6,475,691 B1
(45) Date of Patent: Nov. 5, 2002

(54) TONER PROCESSES

(75) Inventors: Chieh-Min Cheng, Rochester, NY (US); Grazyna E. Kmiecik-Lawrynowicz, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/959,798

(22) Filed: Oct. 29, 1997

(51) Int. Cl.⁷ .............................. G03G 9/08; C08J 3/215
(52) U.S. Cl. .................................. 430/137.14; 523/335
(58) Field of Search ................................ 430/137, 109, 430/137.14; 523/335

(56) References Cited

U.S. PATENT DOCUMENTS

| | | | |
|---|---|---|---|
| 3,674,736 A | 7/1972 | Lerman et al. | 260/41 R |
| 4,137,188 A | 1/1979 | Uetake et al. | 252/62.1 P |
| 4,558,108 A | 12/1985 | Alexandru et al. | 526/340 |
| 4,593,081 A * | 6/1986 | Bobsein et al. | 526/211 |
| 4,797,339 A | 1/1989 | Maruyama et al. | 430/109 |
| 4,983,488 A | 1/1991 | Tan et al. | 430/137 |
| 4,996,127 A | 2/1991 | Hasegawa et al. | 430/109 |
| 5,066,560 A | 11/1991 | Tan et al. | 430/137 |
| 5,112,522 A * | 5/1992 | Sharaby | 526/344.2 |
| 5,216,065 A * | 6/1993 | Colyer et al. | 524/459 |
| 5,278,020 A | 1/1994 | Grushkin et al. | 430/137 |
| 5,290,654 A | 3/1994 | Sacripante et al. | 430/137 |
| 5,308,734 A | 5/1994 | Sacripante et al. | 430/137 |
| 5,344,738 A | 9/1994 | Kmiecik-Lawrynowicz et al. | 430/137 |
| 5,346,797 A | 9/1994 | Kmiecik-Lawrynowicz et al. | 430/137 |
| 5,348,832 A | 9/1994 | Sacripante et al. | 430/109 |
| 5,364,729 A | 11/1994 | Kmiecik-Lawrynowicz et al. | 430/137 |
| 5,370,963 A | 12/1994 | Patel et al. | 430/137 |
| 5,403,693 A | 4/1995 | Patel et al. | 430/137 |
| 5,405,728 A | 4/1995 | Hopper et al. | 430/137 |
| 5,418,108 A | 5/1995 | Kmiecik-Lawrynowicz et al. | 430/137 |
| 5,496,676 A | 3/1996 | Croucher et al. | 430/137 |
| 5,527,658 A | 6/1996 | Hopper et al. | 430/137 |
| 5,561,025 A | 10/1996 | Torres et al. | 430/137 |
| 5,567,566 A * | 10/1996 | Mahabadi et al. | 430/137 |
| 5,585,215 A | 12/1996 | Ong et al. | 430/107 |
| 5,650,255 A | 7/1997 | Ng et al. | 430/137 |
| 5,650,256 A | 7/1997 | Veregin et al. | 430/137 |

* cited by examiner

Primary Examiner—Christopher Rodee
(74) Attorney, Agent, or Firm—E. O. Palazzo

(57) ABSTRACT

A process for the preparation of toner involving (i) aggregating a colorant dispersion containing a suitable surfactant with a latex emulsion containing an anionic surfactant, a nonionic surfactant, and a water miscible chain transfer agent, or a nonionic surfactant with chain transfer characteristics to form toner sized aggregates;

(ii) coalescing or fusing said aggregates; and optionally (iii) isolating, washing, and drying the resulting toner.

5 Claims, No Drawings

TONER PROCESSES

PENDING APPLICATIONS AND PATENTS

Illustrated in U.S. Pat. No. 5,766,817 entitled "Toner Miniemulsion Processes", the disclosure of which is totally incorporated herein by reference, is a process for the preparation of toner by, for example, (i) aggregating a colorant dispersion with a latex miniemulsion containing polymer, an ionic surfactant, a cosurfactant, and a nonionic surfactant;

(ii) coalescing or fusing the aggregates generated; and optionally (iii) cooling, isolating, washing, and drying the toner, and wherein the polymer in said miniemulsion is of a diameter of from about 50 to about 500 nanometers.

Illustrated in copending application U.S. Ser. No. 08/960,754 entitled "Surfactants", and U.S. Pat. No. 5,766,818 entitled "Toner Processes", the disclosures of each application being totally incorporated herein by reference, are cleavable surfactants and the use thereof in emulsion/aggregation and coalescence toner processes.

BACKGROUND OF THE INVENTION

The present invention is generally directed to toner processes, and more specifically, to processes which utilize aggregation and coalescence or fusion of the latex, colorant, such as pigment, dye, or mixtures thereof, and optional additive particles. In embodiments, the present invention is directed to processes which provide toner compositions with a volume average diameter of from about 1 micron to about 20 microns, and preferably from about 2 microns to about 12 microns and a narrow particle size distribution of, for example, from about 1.10 to about 1.45 as measured by the Coulter Counter method, without the need to resort to conventional pulverization and classification methods. The resulting toners can be selected for known electrophotographic imaging and printing processes, including digital color processes. In embodiments, the present invention is directed to a process comprised of blending an aqueous colorant, especially pigment dispersion containing an ionic surfactant with a latex emulsion comprised of polymer, or resin particles, preferably submicron in size, of from, for example, about 0.05 micron to about 1 micron in volume average diameter, a nonionic surfactant and an ionic surfactant of opposite charge polarity to that of the ionic surfactant in the colorant dispersion, and water miscible chain transfer agents, or wherein there is selected a nonionic surfactant with chain transfer characteristics which covalently bond to the surface of the latex selected and thereby, for example, enabling improvements in the latex stability; thereafter, heating the resulting flocculent mixture at, for example, below about or about equal to the resin glass transition temperature, and more specifically, from about 35° C. to about 60° C. (Centigrade) to form toner sized aggregates of from about 2 microns to about 20 microns in volume average diameter, and which toner is comprised of polymer, colorant, especially pigment and optionally additive particles, followed by heating the aggregate suspension above about or about equal to the resin glass transition temperature, and more specifically at, for example, from about 70° C. to about 100° C. to effect coalescence or fusion of the components of the aggregates and to form mechanically stable integral toner particles. The water soluble, or miscible chain transfer agent can regulate the molecular weight of the resin, control the product surface characteristics, avoids the use of costly and hazardous odor producing components, such as carbon tetrabromide, alkyl thiols, such as butanethiol, octanethiol, and the like, reference U.S. Pat. No. 5,561,025 which also discloses emulsion/aggregation/coalescence processes with water phase termination agents and which agents are not water miscible. With the selection of the nonionic surfactant with chain transfer characteristics chain transfer agents like carbon tetrabromide can be avoided, and moreover, the process of the present invention is sediment free, or substantially sediment free. Additionally, in embodiments there can be provided toner particles with spherical shape at lower coalescence temperatures and/or shorter coalescence times. Toners with a smoother surface, and in particular with a spherical shape, transfer efficiently from the photoreceptor surface to the substrate, thereby effectively preserving image integrity during the transfer step, affording higher image signal-to-noise ratios, and thus higher image quality. High toner transfer efficiency also reduces or eliminates toner waste and enables a substantially "cleaner-less" machine design in that the developed images are completely or virtually completely transferred to the substrate, leaving essentially no residual toners on the imaging member, such as the photoreceptor, and thus substantially no waste toner. A cleaner-less machine design also significantly prolongs the photoreceptor life since the mechanical abrasion wear of the photoreceptor as a result of cleaning is eliminated, thus enabling reduced machine maintenance service requirement and lowered hardware cost.

The particle size of the toner compositions provided by the processes of the present invention in embodiments can be preferably controlled by the temperature at which the aggregation of latex, colorant, and optional additives is conducted. In general, the lower the aggregation temperature, the smaller the aggregate size, and thus the final toner size. For a latex polymer with a glass transition temperature (Tg) of about 55° C. and a reaction mixture with a solids content of about 12 percent by weight, an aggregate size of about 7 microns in volume average diameter is obtained at an aggregation temperature of about 53° C.; the same latex will provide an aggregate size of about 5 microns at a temperature of about 48° C. under similar conditions. In embodiments of the present invention, an aggregate size stabilizer can be optionally added during the coalescence to prevent the aggregates from growing in size with increasing temperature, and which stabilizer is generally an ionic surfactant with a charge polarity opposite to that of the ionic surfactant in the colorant, especially pigment dispersion.

In embodiments thereof, the present invention relates to a direct toner preparative process comprised of blending an aqueous colorant dispersion containing, for example, a colorant, such as HELIOGEN BLUE™ or HOSTAPERM PINK™, and a cationic surfactant, such as benzalkonium chloride (SANIZOL B-50™), and a latex emulsion containing an anionic surfactant, such as sodium dodecylbenzene sulfonate (for example NEOGEN R™ or BIOSOFT D40™), and a water miscible chain transfer agent like acids, alcohols, ethers, amines, carbonyl compounds, and the like, and wherein the latex polymer is derived from emulsion polymerization of monomers selected, for example, from the group consisting of styrene, acrylates, methacrylates, acrylonitrile, butadiene, acrylic acid, methacrylic acid, and the like, thereby resulting in the flocculation of the polymer particles with the colorant particles and optional additives; and which flocculent mixture, on further stirring at a temperature of from about 35° C. to about 60° C., results in the formation of toner sized aggregates having an aggregate size of, for example, from about 2 microns to about 10 microns in volume average diameter as measured by the Coulter Counter (Microsizer II) and a particle size distribution of about 1.15 to about 1.35; thereafter, heating the aggregate suspension at from about 70° C. to about 95° C. to form toner particles; followed by filtration, washing, and drying in an oven, or the like. The aforementioned toners are especially useful for imaging processes, especially xerographic processes, which usually require high toner transfer efficiency, such as those having a compact machine design without a cleaner or those that are designed to provide high quality colored images with excellent image resolution and signal-to-noise ratio as well as image uniformity.

PRIOR ART

There is illustrated in U.S. Pat. No. 4,996,127 a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70, are obtained. The disadvantages of, for example, poor particle size distributions result, hence classification is required resulting in low toner yields, reference U.S. Pat. No. 4,797,339, wherein there is disclosed a process for the preparation of toners by resin emulsion polymerization, wherein similar to the '127 patent certain polar resins are selected, and wherein flocculation as in the present invention is not believed to be disclosed; and U.S. Pat. No. 4,558,108, wherein there is disclosed a process for the preparation of a copolymer of styrene and butadiene by specific suspension polymerization.

In U.S. Pat. No. 5,561,025 there is illustrated emulsion/aggregation/coalescence processes wherein water phase termination agents, that is chain transfer agents that are not water miscible, are selected.

Other prior art that may be of interest includes U.S. Pat. Nos. 3,674,736; 4,137,188 and 5,066,560.

Emulsion/aggregation processes for the preparation of toners are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255 and 5,650,256.

Processes for the preparation of spherical toners at coalescence temperatures of from about 101 to about 120° C. are illustrated in U.S. Pat. No. 5,501,935, the disclosure of which is totally incorporated herein by reference.

The appropriate comments and processes of the above patents may be selected for the processes of the present invention in embodiments thereof.

SUMMARY OF THE INVENTION

It is a feature of the present invention to provide toner processes with many of the advantages illustrated herein.

In another feature of the present invention there are provided simple and economical processes for the preparation of black and colored toner compositions with excellent colorant, especially pigment dispersion, thus enabling the achievement of excellent color print quality.

In a further feature of the present invention there is provided a process for the preparation of toner compositions with a volume average diameter of from between about 1 to about 20 microns, and preferably from about 2 to about 12 microns, and a particle size distribution of about 1.10 to about 1.35, and preferably from about 1.15 to about 1.25 as measured by a Coulter Counter without the need to resort to conventional classifications to narrow the toner particle size distribution.

In a further feature of the present invention there is provided a process for the preparation of toner by aggregation and coalescence, or fusion (aggregation/coalescence) of latex, colorant, such as pigment, and additive particles in the presence of water miscible chain transfer agents, or components, or wherein there is selected a nonionic surfactant with chain transfer characteristics, and which chain transfer agents can facilitate chain termination in the aqueous phase thereby, for example, regulating the functional group, such as carboxylic acid amount or distribution in the resin latex, reduce the amount of grafted acrylic acid, and thus provide stable aggregates.

Moreover, in a further feature of the present invention there is provided a process for the preparation of toner compositions which after fixing to paper substrates results in images with an image gloss of from about 20 GGU (Gardner Gloss Units) up to over 75 GGU as measured by Gardner Gloss meter, depending on the substrate and intended application.

In yet another feature of the present invention there are provided toner compositions with low fusing temperatures of from about 120° C. to about 180° C., and which toner compositions exhibit excellent blocking characteristics at and above about 45° C.

In still a further feature of the present invention there are provided toner compositions which provide high image projection efficiency, such as for example over 75 percent as measured by the Match Scan II spectrophotometer available from Million-Roy.

In a further feature of the present invention there are provided toner compositions which when fixed on paper do not give rise to objectionable image feel or paper curl.

In embodiments of the present invention, there are provided processes for the preparation of toner compositions by the aggregation/coalescence of latex and colorant, especially pigment particles in the presence of a water miscible chain transfer agent, or in the presence of a nonionic surfactant with chain transfer characteristics, and wherein the temperature of aggregation may be selected to control the aggregate size, and thus the final toner particle size, and the coalescence temperature and time may be utilized to control the toner shape and surface properties.

Embodiments of the present invention include a process for the preparation of toner comprising (i) aggregating a colorant dispersion containing a suitable surfactant with a latex emulsion containing an anionic surfactant, a nonionic surfactant, and a water miscible chain transfer agent, or a nonionic surfactant with chain transfer characteristics to form toner sized aggregates;

(ii) coalescing or fusing said aggregates; and optionally
(iii) isolating, washing, and drying the resulting toner; a process wherein said aggregating is below about the glass transition temperature of the polymer present in the latex emulsion; the coalescing or fusing of said aggregates is above about the polymer glass transition temperature; and there results toner with a size of from about 2 to about 20 microns in volume average diameter, and isolating, washing, and drying are accomplished; a process wherein said temperature below the glass transition temperature is from about 25° C. to about 60° C., and said heating above the glass transition temperature is from about 60° C. to about 100° C.; a process wherein said temperature below the glass transition temperature is from about 35° C. to about 55° C., and said heating above the glass transition temperature is from about 70° C. to about 95° C.; a process wherein the temperature at which said aggregating is accomplished controls the size of the aggregates, and wherein the final toner size is from about 2 to about 10 microns in volume average diameter, and wherein the temperature and time of said coalescing of the components of aggregates control the shape of the resultant toner, and wherein there is accomplished the isolating, washing, and drying of said toner product; a process wherein the aggregating is accomplished at a temperature of from about 45° C. to about 55° C., and wherein the coalescing is accomplished at a temperature of from about 85° C. to about 95° C.; a process wherein said water miscible chain transfer agent is selected in an amount of from about 0.5 to about 10 weight percent based on the amount of polymer resin contained in said latex; a process wherein said water miscible chain transfer agent is an acid, an alcohol, an ether, an amine, an amide, a ketone, an aldehyde, or a carboxylic ester; a process wherein the alcohol is methanol, ethanol, propanol, butanol, ethylene glycol, or glycerol; the acid is formic acid, acetic acid, propionic acid, butanoic acid, or succinic acid; the amine is methylamine, ethylamine, propylamine, butylamine, diethylamine, or trimethylamine; the ether is methyl ether, ethyl ether, propyl ether, butyl ether, tetrahydrofuran, or trioxane; the amide is acetamide or propanamide; the ketone is acetone, butanone, or pentanone; the aldehyde is formaldehyde, acetaldehyde, propanal, or butanal; and the carboxylic ester is methyl formate, ethyl formate, or methyl acetate; a process wherein the alcohol is isopropanol or n-butanol, the acid is acetic acid, the amine is trimethylamine, the ether is ethyl ether or tetrahydrofuran, the ketone is acetone, the aldehyde is formaldehyde, and the ester is ethyl formate; a process wherein the chain transfer agent is isopropanol, n-butanol, or tetrahydrofuran, each present in effective amounts; for isopropanol from about 0.5 to about 3 percent by weight of the polymer resin of the latex; for n-butanol from 0.5 to 3 percent by weight of the polymer resin; and for tetrahydrofuran from about 0.5 to about 2 percent by weight of the polymer resin; a process wherein said nonionic surfactant with chain transfer characteristics is an adduct of ethylene oxide and dodecyl mercaptan; a process wherein said adduct is a polyethylene tertiary thioether, a polyethylene thioester, or an ethoxylated thiol; a process wherein said nonionic surfactant with chain transfer characteristics is a polyethylene tertiary thioether of the formula $C_{11}H_{25}C-S-CH_2-O-(CH_2CH_2O)_nH$ wherein n represents the number of segments, and is a number of from about 10 to about 40; ethoxylated dodecyl mercaptan with the formula $HS-C_{11}H_{22}-O-(CH_2CH_2O)_mH$ wherein m is a number of from about 20 to about 50; polyethylene thioesters of the formula $CH_3-O-(CH_2CH_2O)_k-COOCH_2-SH$ wherein k is from about 10 to about 40, and wherein each surfactant is present in an amount of from about 0.1 to about 10 percent by weight of the monomers selected for the preparation of the latex polymer; a process wherein said nonionic surfactant with chain transfer characteristics is covalently bonded to the surface of the latex; a process wherein there is selected for the latex a second chain transfer agent; a process wherein said second transfer agent is dodecanethiol, and is selected in an amount of from about 0.1 to about 10 percent by weight of the latex polymer, or latex resin; a process wherein the colorant is a pigment, and wherein said pigment dispersion contains an ionic surfactant, and the latex emulsion contains a nonionic surfactant and an ionic surfactant of opposite charge polarity to that of ionic surfactant present in said pigment dispersion; a process wherein there is selected a cationic surfactant for the colorant dispersion, and there is an ionic surfactant present in the latex mixture, and which surfactant is an anionic surfactant; a process wherein the aggregating is conducted at a temperature of from about 15° C. to about 1° C. below the Tg of the latex resin for a duration of from about 0.5 hour to about 3 hours, and wherein the coalescing of the components of aggregates for the formation of integral toner particles comprised of colorant and resin is accomplished at a temperature of about 85° C. to about 95° C. for a duration of from about 1 hour to about 5 hours; a process wherein the latex contains a polymer or resin selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid), wherein said resin is present in an amount of about 80 percent by weight to about 98 percent by weight of toner, and wherein said colorant is a pigment; a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadieneacrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylononitrile-acrylic acid); a process wherein the anionic surfactant is selected from the group consisting of sodium dodecyl sulfate, sodium dodecylbenzene sulfate and sodium dodecyinaphthalene sulfate, and wherein the cationic surfactant is a quaternary ammonium salt; a process wherein the colorant is carbon black, magnetite, cyan, yellow, magenta, or mixtures thereof; a process wherein the toner particles isolated are from about 2 to about 10 microns in average volume diameter, and the particle size distribution thereof is from about 1.15 to about 1.30, wherein each of the surfactants utilized represents from about 0.01 to about 5 weight percent of the total reaction mixture, wherein there is added to the surface of the formed toner metal salts, metal salts of fatty acids, silicas, metal oxides, or mixtures thereof, each in an amount of from about 0.1 to about 10 weight percent of the obtained toner particles, and wherein washing and drying are accomplished; a process for the preparation of toner comprising (i) aggregating a colorant dispersion with a latex emulsion containing a water miscible chain transfer agent; and (ii) coalescing the aggregates formed; and a process wherein suitable surfactants are selected for the colorant dispersion and the latex emulsion, wherein aggregating is accomplished by heating below about the glass transition temperature of the latex resin; coalescing is accomplished by heating above about the glass transition temperature of the latex resin; and subsequent to (ii) the toner product is isolated and washed to remove surfactants.

In embodiments, the present invention is directed to processes for the preparation of toner compositions, which comprise blending an aqueous colorant dispersion preferably containing a pigment, such as carbon black, phthalocyanine, quinacridone or RHODAMINE B™ type, red, green, yellow, brown, cyan, magenta, with a cationic surfactant, such as benzalkonium chloride, with a latex emulsion derived from the emulsion polymerization of monomers selected from the group consisting of styrene, butadiene, acrylates, methacrylates, acrylonitrile, acrylic acid, methacrylic acid, and the like, and a water miscible chain transfer agent, and which latex contains an anionic surfactant, such as sodium dodecylbenzene sulfonate and a nonionic surfactant, and has a resin latex size of, for example, from about 0.05 to about 1.0 micron; heating the resulting flocculent mixture at a temperature below or about equal to the Tg of the polymer or resin formed in the latex, and ranges, for example, from about 30° C. to about 55° C. for an effective length of time of, for example, 0.5 hour to about 2 hours to form toner sized aggregates; and subsequently heating the aggregate suspension at a temperature at or above the latex polymer Tg, for example from about 60° C. to about 100° C. to provide toner particles; and finally isolating the toner product by filtration, washing and drying in an oven, fluid bed dryer, freeze dryer, or spray dryer; whereby toner particles comprised of polymer, or resin, colorant, and optional additives are obtained.

With the processes of the present invention, water miscible chain transfer agents are selected in various suitable effective amounts of, for example, from about 0.1 to about 10, and preferably from about 0.5 to about 3 percent by weight, or parts of the latex emulsion, and which agents assist in promoting coalescence or fusion of the components of the aggregates. More specifically, the weight percent can be determined by dividing the amount of the chain transfer agent by the total weight of the monomers used to prepare the copolymer resin, and multiplying the result by 100. Examples of water miscible chain transfer agents include aliphatic alcohols with, for example, from about 1 to about 12, and preferably from about 4 to about 8 carbon atoms, such as methanol, ethanol, propanol, butanol, pentanol, methylpropanol, ethylene glycol, and glycerol, and more preferably, 2-isopropanol and 1-butanol; ethers such as alkyl ethers like methyl ether, ethyl ether, propyl ether, and butyl ether, tetrahydrofuran, trioxane, dioxane, and dimethoxymethane, and preferably ethyl ether; acids such as formic acid, acetic acid, propionic acid, butanoic acid, and succinic acid, and preferably acetic acid; amines such as methylamine, ethylamine, propylamine, butylamine, diethylamine, and trimethylamine, and preferably triethylamine; amides such as acetamide and propanamide; ketones such as acetone, butanone, and pentanone, and preferably acetone; aldehydes such as formaldehyde, acetaldehyde, propanal, and butanal, and preferably formaldehyde; and esters such as methyl formate, ethyl formate, and methyl acetate. Preferred chain transfer agents, or components in embodiments are isopropanol, butanol, or pentylol. The chain transfer agents are preferably utilized with other known chain transfer agents, such as dodecanethiol, carbon tetrachloride, dibutyl disulfide, and the like, and wherein the mixture of chain transfer agents contain, for example, from about 1 to about 99, and preferably from about 40 to about 65 parts of a first water miscible chain transfer agent, and from 99 to about 1, and preferably from about 35 to about 60 parts of the second chain transfer agent.

Generally, the primary function of the water miscible chain transfer agents or nonionic transurfs is to ensure adequate termination of growing oligomer chains either in the water phase or at the interfaces between the water and particle phases. These agents regulate the chain length of the oligomers, and oligomers that possess a weight average molecular weight of from about 1,000 to about 3,000 are desired in embodiments.

When latexes are synthesized by emulsion polymerization with polar comonomers, an example being polar comonomers with groups that can dissociate to yield charged groups (e.g. acidic or basic comonomers such as acrylic acid), the polar comonomers may react to form polar groups which are chemically bound to the surfaces of particles, depending on the process and whether the water miscible chain transfer agents are absent, which can prevent a sufficiently strong attraction from forming between two aggregating particles. When the attraction is not sufficiently strong, the aggregates formed from such particles will have a greater tendency to break apart. Water miscible chain transfer agents, which ensure adequate termination of growing chains either in the aqueous phase or at the interfaces between the water and particle phases, can be used in the emulsion polymerization to minimize or eliminate this problem, since such agents can reduce the number of such polar groups that are chemically bound to the surfaces of the resin particles. The use of water miscible chain transfer agents during emulsion polymerization can thus result in latex particles with improved colloidal properties in that the breakup of, or separating of aggregates during the coalescence stage is minimized or prevented with better control over a wider range of conditions than may be effectively achieved otherwise.

In embodiments of the present invention as indicated herein there can be selected water miscible nonionic surfactants (transurf) with chain transfer characteristics, such as aliphatic mercaptans, it being noted that the agents of U.S. Pat. No. 5,561,025 are not water miscible, and rather they are, it is believed, relatively highly water-insoluble. The water solubility of these water insoluble mercaptans at 25° C. is less than $10^{-2}$ grams per liter. Examples of the mercaptan containing chain transfer compounds selected for the present invention in embodiments include ethylene oxide adducts of dodecyl mercaptan of, for example, polyethylene tertiary thioethers chain transfer agents of the formula $C_{11}H_{25}C-S-CH_2-O-(CH_2CH_2O)_nH$, wherein n represents the number of segments, and is a number of, for example, from about 1 to about 55 (for example ALCODET SK™ or ALCODET 218™ available from Rhone-Poulenc); ethoxylated thiols of the formula $HS-C_{11}H_{22}-O-(CH_2CH_2O)_mH$ wherein m represents the number of segments, and is a number of, for example, from about 1 to about 40; and polyethylene thioesters of the formula $CH_3-O-(CH_2CH_2O)_k-COOCH_2-SH$ wherein k represents the number of segments, and is a number of, for example, from about 1 to about 40. An effective concentration of the nonionic transurf is, for example, from about 0.1 to about 10 percent by weight, and preferably from about 0.5 to about 3 percent by weight of the monomers used to prepare the copolymer resin.

Embodiments of the present invention include a process for the preparation of toner comprised of polymer and colorant, especially pigment comprising (i) blending an aqueous pigment dispersion containing an ionic surfactant with a latex emulsion containing resin, or polymer, a nonionic surfactant, and an ionic surfactant with a charge polarity opposite to that of ionic surfactant in the pigment dispersion, and a water miscible chain transfer agent, or a transurf component with chain transfer characteristics;

(ii) heating the resulting mixture at a temperature about 25° C. to about 1° C. below the Tg (glass transition temperature) of the latex polymer to form toner sized aggregates;

(iii) subsequently heating the aggregate suspension to a temperature of about 75° C. to about 11° C. to effect coalescence or fusion of the components of aggregates to enable formation of integral toner particles comprised of polymer, colorant, especially pigment and optional additives; and (iv) isolating the toner product by, for example, filtration, followed by washing and drying.

In embodiments, the present invention is directed to processes for the preparation of toner compositions which comprise (i) preparing an ionic colorant mixture by dispersing a colorant, especially pigment, such as carbon black, HOSTAPERM PINK™, or PV FAST BLUE™, in an aqueous surfactant solution containing a cationic surfactant, such as dialkylbenzene dialkylammonium chloride like SANIZOL B-50™ available from Kao or MIRAPOL™ available from Alkaril Chemicals, by means of a high shearing device such as a Brinkmann Polytron or IKA homogenizer; (ii) adding the aforementioned colorant, especially pigment mixture to a mixture of a water immiscible chain transfer agent, or transurf, optional additives, and a latex emulsion of polymer particles of, for example, poly(styrene-butyl acrylate-acrylic acid), poly(styrene-butadiene-acrylic acid), and the like, an anionic surfactant such as sodium dodecylsulfate, dodecylbenzene sulfonate NEOGEN R™ or BIOSOFT D40™, and a nonionic surfactant such as polyethylene glycol or polyoxyethylene glycol nonyl phenyl ether or IGEPAL 897™ obtained from GAF Chemical Company, thereby causing a flocculation of pigment, polymer particles and optional additives; (iii) homogenizing the resulting flocculent mixture with a high shearing device, such as a Brinkmann Polytron or IKA homogenizer, and further stirring with a mechanical stirrer at a temperature of about 1° C. to about 25° C. below the Tg of the latex polymer to form toner sized aggregates of from about 2 microns to about 10 microns in volume average diameter; (iv) and heating the mixture in the presence of additional anionic surfactant or nonionic surfactant at a temperature of 95° C. or below for a duration of, for example, from about 1 to about 5 hours to form 2 to about 12 micron toner preferably with a particle size distribution of from about 1.15 to about 1.35 as measured by the Coulter Counter; and (v) isolating the toner particles by filtration, washing, and drying. Additives to improve flow characteristics and charge additives, if not initially present, to improve charging characteristics may then be added by blending with the formed toner, such additives including AEROSILS® or silicas, metal oxides like tin, titanium and the like, metal salts of fatty acids, like zinc stearate, and which additives are present in various effective amounts, such as from about 0.1 to about 10 percent by weight of the toner.

Illustrative examples of specific resin, polymer or polymers selected for the process of the present invention include, and more specifically for the latex, known polymers such as poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and the like. The latex polymer is generally present in the latex and in the toner compositions in various effective amounts, such as from about 75 weight percent to about 98 weight percent of the toner, and the latex resin, or polymer size suitable for the processes of the present invention can be, for example, from about 0.05 micron to about 1 micron in volume average diameter as measured by the Brookhaven nanosize particle analyzer. Other sizes and effective amounts of latex polymer may be selected in embodiments.

The polymer selected for the process of the present invention can be prepared by emulsion polymerization methods, and the monomers utilized in such processes include styrene, acrylates, methacrylates, butadiene, isoprene, acrylic acid, methacrylic acid, acrylonitrile, and the like. Known chain transfer agents, for example dodecanethiol, about 0.1 to about 10 percent, or carbon tetrabromide in effective amounts, such as from about 0.1 to about 10 percent, can also be utilized to control the molecular weight properties of the polymer when emulsion polymerization is selected. Other processes of obtaining polymer particles of from, for example, about 0.01 micron to about 2 microns can be selected from polymer microsuspension process, such as disclosed in U.S. Pat. No. 3,674,736, the disclosure of which is totally incorporated herein by reference, polymer solution microsuspension process, such as disclosed in U.S. Pat. No. 5,290,654, the disclosure of which is totally incorporated herein by reference, mechanical grinding processes, or other known processes.

Various known colorants, such as pigments, present in the toner in an effective amount of, for example, from about 1 to about 15 percent by weight of toner, and preferably in an amount of from about 3 to about 10 percent by weight, that can be selected include carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are cyan, magenta, or yellow, and mixtures thereof. Examples of magenta colorants that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan colorants that may be used as pigments include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow colorants that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention.

Colorants include pigment, dye, mixtures of pigment and dyes, mixtures of pigments, mixtures of dyes, and the like.

The toner may also include known charge additives in effective suitable amounts of, for example, from 0.1 to 5 weight percent, such as alkyl pyridinium halides, bisulfates, the charge control additives of U.S. Pat. No. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

Surfactants in effective amounts of, for example, 0.01 to about 15 weight percent of the reaction mixture in embodiments include, for example, nonionic surfactants that preferably do not possess chain transfer characteristics. Examples of surfactants are dialkylphenoxy poly (ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ in effective amounts of, for example, from about 0.1 to about 10 percent by weight of the reaction mixture; anionic surfactants, such as for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, BIO-SOFT D40™ obtained from Stepan, and the like, in effective amounts of, for example, from about 0.01 to about 10 percent by weight; cationic surfactants, such as for example dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, in effective amounts of, for example, from about 0.01 percent to about 10 percent by weight. Preferably, the molar ratio of the cationic surfactant used for flocculation to the anionic surfactant used in the latex preparation is in the range of from about 0.5 to about 4.

Examples of the surfactant, which are added to the aggregates before coalescence is initiated, can be selected from the anionic surfactants such as sodium dodecylbenzene sulfonate, sodium dodecyinaphthalene sulfate, dialkyl benzenealkyl, sulfates and sulfonates, abitic acid, available from Aldrich, NEOGEN R™, NEOGEN SC™ obtained from Kao, BIOSOFT D40™ obtained from Stepan, and the like. They can also be selected from nonionic surfactants such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. An effective amount of the anionic or nonionic surfactant utilized in the coalescence step to stabilize the aggregate size against further growth with temperature is, for example, from about 0.01 to about 10 percent by weight, and preferably from about 0.5 to about 5 percent by weight of reaction mixture.

Surface additives that can be added to the toner compositions after washing or drying include, for example, metal salts, metal salts of fatty acids, colloidal silicas, mixtures thereof and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and AEROSIL R972™ available from Degussa in amounts of from 0.1 to 2 percent which can be added during the aggregation process or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration. Moreover, carriers comprised of a core with a polymethylmethacrylate (PMMA) coating with a conductive component dispersed therein, such as carbon black, can be selected for the developer compositions.

Imaging methods are also envisioned with the toners of the present invention, reference for example a number of the patents mentioned herein, and U.S. Pat. No. 4,265,660, the disclosure of which is totally incorporated herein by reference.

The following Examples are being submitted to further define various pieces of the present invention. These Examples are intended to be illustrative only and are not intended to limit the scope of the present invention. Comparative Examples and data are also provided.

EXAMPLE I

A latex emulsion comprised of polymer particles derived from emulsion polymerization of styrene, butyl acrylate and acrylic acid was prepared as follows. 221.4 Grams of styrene, 48.6 grams of butyl acrylate, 5.4 grams of acrylic acid, 5.4 grams of 1-dodecanethiol and 8.1 grams of the water miscible chain termination, or chain transfer agent isopropanol were mixed with 391 grams of deionized water in which 19.2 grams of sodium dodecyl benzene sulfonate anionic surfactant, NEOGEN R™ (20 percent active), 5.8 grams of polyoxyethylene nonyl phenyl ether—nonionic surfactant, ANTAROX CA 897™ (70 percent active), and 2.7 grams of ammonium persulfate initiator were dissolved. The resulting mixture was stirred at room temperature of about 25° C. under a nitrogen atmosphere for 30 minutes. Subsequently, the mixture was stirred and heated to 70° C. (Centigrade throughout) at a rate of 1° C. per minute, and retained at this temperature for 6 hours. The resulting latex polymer possessed an $M_w$ of 23,900, an $M_n$ of 5,400 as determined on a Waters GPC, and a mid-point Tg of 61.4° C. as measured on a Seiko DSC.

251.0 Grams of the above prepared latex emulsion and 220.0 grams of an aqueous cyan pigment dispersion containing 7.6 grams of Cyan Pigment 15.3, and 2.3 grams of cationic surfactant SANIZOL B-50™ were simultaneously added to 400 milliliters of water with high stirring at 6,000 rpm for 3 minutes by means of a polytron. The resulting mixture was then transferred to a 2 liter reaction vessel and heated at a temperature of 55° C. for 2.0 hours before 30 milliliters of 20 percent aqueous NEOGEN R™ solution were added. Aggregates with a particle size (volume average diameter) of about 6 microns with a GSD =1.20, as measured on the Coulter Counter, were obtained. Subsequently, the mixture was heated to 90° C. and held there for a period of 3 hours before cooling down to room temperature, about 25° C. throughout, filtered, washed with water a number of times, and dried in a freeze dryer. The final toner product evidenced a particle size of 6.6 microns in volume average diameter with a particle size distribution of 1.19 as measured on a Coulter Counter, and was shown to be relatively spherical in shape by scanning electron microscopy.

The resulting toner, that is the above final toner product, was comprised of about 93 percent of polymer, poly (styrene-butyl acrylate-acrylic acid), and 15:cyan pigment, about 7 percent by weight of toner, with an average volume diameter of 6.6 microns and a GSD of 1.19, indicating that one can retain toner particle size and GSD achieved in the aggregation step during coalescence, without the aggregates falling apart and without an excessive increase in particle size, when isopropanol was selected for the emulsion polymerization to ensure the formation of latex particles with the desired colloidal properties, presumably primarily by ensuring adequate termination of oligomers in the aqueous phase.

EXAMPLE II

A latex emulsion comprised of polymer particles derived from emulsion polymerization of styrene, butyl acrylate and acrylic acid was prepared as follows. 221.4 Grams of styrene, 48.6 grams of butyl acrylate, 5.4 grams of acrylic acid, 5.4 grams of 1-dodecanethiol and 5.4 grams of n-butanol as the water miscible chain termination agent were mixed with 391 grams of deionized water in which 19.2 grams of sodium dodecyl benzene sulfonate anionic surfactant NEOGEN R™ (20 percent active), 5.8 grams of polyoxyethylene nonyl phenyl ether—nonionic surfactant, ANTAROX CA 897™ (70 percent active), and 2.7 grams of ammonium persulfate initiator were dissolved. The resulting mixture was stirred at room temperature of about 25° C. under a nitrogen atmosphere for 30 minutes. Subsequently, the mixture was stirred and heated to 70° C. (Centigrade throughout) at a rate of 1° C. per minute, and retained at this temperature for 6 hours. The resulting latex polymer possessed an $M_w$ of 23,500, an $M_n$ of 5,300 as determined on a Waters GPC, and a mid-point Tg of 58.3° C. as measured on a Seiko DSC.

260.0 Grams of the latex emulsion as prepared above and 220.0 grams of an aqueous cyan pigment dispersion containing 7.6 grams of Cyan Pigment 15.3, and 2.4 grams of cationic surfactant SANIZOL B-50™ were simultaneously added to 400 milliliters of water with high shear stirring at 6,000 rpm for 3 minutes by means of a polytron. The mixture was transferred to a 2 liter reaction vessel and heated at a temperature of 53° C. for 2.0 hours before 30 milliliters of 20 percent aqueous NEOGEN R™ solution was added. Aggregates with a particle size diameter of 5.8 microns with a GSD=1.20, as measured on the Coulter Counter, were obtained. Subsequently, the mixture was heated to 93° C. and held there for a period of 3 hours before cooling down to room temperature, filtered, washed with water, and dried in a freeze dryer. The final toner product evidenced a particle size of 6.4 microns in volume average diameter with a particle size distribution of 1.20 as measured on a Coulter Counter, and was shown to be smooth and spherical in shape by scanning electron microscopy.

The resulting toner product was comprised of about 93 percent of polymer, poly(styrene-butyl acrylate-acrylic acid), and 15:3 cyan pigment, about 7 percent by weight of toner, with an average volume diameter of 6.4 microns and a GSD of 1.20, indicating that one can retain particle size and GSD achieved in the aggregation step during coalescence, without the aggregates falling apart and without an excessive increase in particle size, when n-butanol was utilized by, it is believed, ensuring adequate termination of oligomers in the aqueous phase.

EXAMPLE III

A latex emulsion comprised of polymer particles derived from emulsion polymerization of styrene, butyl acrylate and acrylic acid was prepared as follows. 221.2 Grams of styrene, 48.6 grams of butyl acrylate, 5.4 grams of acrylic acid, 6.8 grams of 1-dodecanethiol and 4.1 grams of tetrahydrofuran as the water miscible chain termination agent were mixed with 391 grams of deionized water in which 19.2 grams of sodium dodecyl benzene sulfonate anionic surfactant NEOGEN R™ (20 percent active), 5.8 grams of polyoxyethylene nonyl phenyl ether—nonionic surfactant, ANTAROX CA 897™ (70 percent active), and 2.7 grams of ammonium persulfate initiator were dissolved. The resulting mixture was stirred at room temperature of about 25° C. under a nitrogen atmosphere for 30 minutes. Subsequently, the mixture was stirred and heated to 80° C. (Centigrade throughout) at a rate of 1° C. per minute, and retained at this temperature for 6 hours. The resulting latex polymer possessed an $M_w$ of 23,200, an $M_n$ of 5,700 as determined on a Waters GPC, and a mid-point Tg of 54.9° C. as measured on a Seiko DSC.

260.0 Grams of the latex emulsion as prepared above and 220.0 grams of an aqueous cyan pigment dispersion containing 7.6 grams of Cyan Pigment 15.3, 2.4 grams of cationic surfactant SANIZOL B-50™ were simultaneously added to 400 milliliters of water with high shear stirring at 6,000 rpm for 3 minutes by means of a polytron. The mixture was transferred to a 2 liter reaction vessel and heated at a temperature of 50° C. for 2.0 hours before 30 milliliters of 20 percent aqueous NEOGEN R™ solution was added. Aggregates with a particle size of 6.2 microns with a GSD=1.20, as measured on the Coulter Counter, were obtained. Subsequently, the mixture was heated to 90° C. and held there for a period of 3 hours before cooling down to room temperature, about 25° C. throughout, filtered, washed with water, and dried in a freeze dryer. The final toner product evidenced a particle size of 6.7 microns in volume average diameter with a particle size distribution of 1.18 as measured on a Coulter Counter, and was shown to be relatively spherical in shape by scanning electron microscopy.

The resulting toner was comprised of about 93 percent of polymer, poly(styrene-butyl acrylate-acrylic acid), and cyan pigment, about 7 percent by weight of toner, with an average volume diameter of 6.7 microns and a GSD of 1.18, indicating that one can retain particle size and GSD achieved in the aggregation step during coalescence, without the aggregates falling apart, or separating and without an excessive increase in particle size, when tetrahydrofuran was selected.

EXAMPLE IV

A latex emulsion comprised of polymer particles derived from emulsion polymerization of styrene, butyl acrylate and acrylic acid was prepared as follows. 432 Grams of styrene, 108 grams of butyl acrylate, 16.2 grams of acrylic acid, and 16.2 grams of 1-dodecanethiol were mixed with 810 grams of deionized water in which 16.5 grams of sodium dodecyl benzene sulfonate anionic surfactant, BIOSOFT D40™ (38 percent active), 8.1 grams of ammonium persulfate initiator and 6.3 grams of polyethylene tertiary thioether, ALCODET SK™ (99 percent active), as the nonionic surfactant with water phase chain termination characteristics (transurf) were dissolved. The resulting mixture was stirred at room temperature of about 25° C. under a nitrogen atmosphere for 30 minutes. Subsequently, the mixture was stirred and heated to 70° C. (Centigrade throughout) at a rate of 1° C. per minute, and retained at this temperature for 6 hours. The resulting latex polymer possessed an $M_w$ of 25,700, an $M_n$ of 5,800 as determined on a Waters GPC, and a mid-point Tg of 54.8° C. as measured on a Seiko DSC.

260.0 Grams of the latex emulsion as prepared above and 220.0 grams of an aqueous cyan pigment dispersion containing 7.6 grams of Cyan Pigment 15.3, 2.3 grams of cationic surfactant SANIZOL B-50™ were simultaneously added to 400 milliliters of water with high shear stirring at 6,000 rpm for 3 minutes by means of a polytron. The mixture was transferred to a 2 liter reaction vessel and heated at a temperature of 50° C. for 1.5 hours before 20 milliliters of 20 percent aqueous BIOSOFT D-40™ solution were added. Aggregates with a particle size diameter of 6.9 microns with a GSD=1.20, as measured on the Coulter Counter, were obtained. Subsequently, the mixture was heated to 93° C. and held there for a period of 2 hours before cooling down to room temperature, about 25° C. throughout, filtered, washed with water, and dried in a freeze dryer. The final toner product evidenced a particle size of 7.5 microns in volume average diameter with a particle size distribution of 1.19 as measured on a Coulter Counter, and was shown to be relatively spherical in shape by scanning electron microscopy.

The resulting toner was comprised of about 93 percent of polymer, poly(styrene-butyl acrylate-acrylic acid), and cyan pigment, about 7 percent by weight of toner, with an average volume diameter of 6.7 microns and a GSD of 1.18, indicating that one can retain particle size and GSD achieved in the aggregation step during coalescence without the aggregates falling apart, or separating, and without an excessive increase in particle size, when polyethylene tertiary thioether ALCODET SK™ was selected to provide, for example, latex particles with the desired colloidal properties, presumably by ensuring adequate termination of oligomers in the aqueous phase.

COMPARATIVE EXAMPLE A

A latex emulsion comprised of polymer particles derived from emulsion polymerization of styrene, butyl acrylate and acrylic acid was prepared as follows. 221.4 Grams of styrene, 48.6 grams of butyl acrylate, 10.8 grams of acrylic acid, and 7.4 grams of 1-dodecanethiol were mixed with 391 grams of deionized water in which 19.2 grams of sodium dodecyl benzene sulfonate anionic surfactant, NEOGEN R™ (20 percent active), 5.8 grams of polyoxyethylene nonyl phenyl ether—nonionic surfactant, ANTAROX CA 897™ (70 percent active), and 2.7 grams of ammonium persulfate initiator were dissolved. No water miscible chain transfer agent or nonionic transurf were added for the purpose of, for example, thus increasing termination of oligomers in the aqueous phase or at the interfaces between the emulsion particles and the aqueous phase. The resulting mixture was stirred at room temperature of about 25° C. under a nitrogen atmosphere for 30 minutes. Subsequently, the mixture was stirred and heated to 70° C. (Centigrade throughout) at a rate of 1° C. per minute, and retained at this temperature for 6 hours. The resulting latex polymer possessed an $M_w$ of 22,700, an $M_n$ of 7,200 as determined on a Waters GPC, and a mid-point Tg of 54.7° C. as measured on a Seiko DSC.

260.0 Grams of the latex emulsion as prepared above and 220.0 grams of an aqueous cyan pigment dispersion containing 7.6 grams of Cyan Pigment 15.3, 2.4 grams of cationic surfactant SANIZOL B-50™ were simultaneously added to 400 milliliters of water with high shear stirring at 6,000 rpm for 3 minutes by means of a polytron. The mixture was transferred to a 2 liter reaction vessel and heated at a temperature of 50° C. for 2.0 hours. Aggregates with a particle size diameter of 5.1 microns with a GSD=1.18, as measured on the Coulter Counter, were obtained. Subsequently, 30 milliliters of 20 percent aqueous NEOGEN R™ solution was added to the suspension of aggregates to prevent any further change in aggregate size. The mixture was heated to 90° C. and held there for a period of 3 hours to coalesce the aggregates. After 10 minutes, the particle size was less than 1.59 microns, indicating that the aggregates were falling apart, and separating.

The aggregation at 50° C. was repeated with separate samples of the pigment dispersion and latex, after which the aggregates were coalesced without the addition of (40 milliliters of 20 percent aqueous NEOGEN R™ were added to the aggregates before coalescence) additional anionic surfactant. In the coalescence, the temperature of the aggregated particles in the reaction vessel was raised to 90° C., and retained at 90° C. for 2 hours to coalesce the aggregates; no anionic surfactant was added after the aggregation at 50° C. was completed. The aggregate size grew during the coalescence step to 11.6 microns with a GSD of 1.58.

These results indicate that the addition of an extra amount of surfactant (NEOGEN R™ is a surfactant in this situation) after the aggregation and prior to the coalescence in the aggregation-coalescence processes of the types described herein causes the aggregated to have a greater propensity to fall apart as evidenced by this Comparative Example when no water phase termination agent is added during the emulsion polymerization to ensure that the latex particles have desirable colloidal properties. If no extra stabilizer is added, the particle size increases substantially to 11 to 15 microns as demonstrated by this Comparative Example. Thus, the use of the water miscible chain transfer agents or nonionic transurfs during the emulsion polymerization can yield latexes with superior behavior and toners thereof wherein the final toner size diameter is similar to that, or the same as the aggregate size diameter.

Other modifications of the present invention will occur to those of ordinary skill in the art subsequent to a review of the present application. These modifications and equivalents thereof are intended to be included within the scope of the present invention.

What is claimed is:

1. A process for the preparation of toner comprising (i) aggregating a colorant dispersion containing a surfactant with a latex emulsion generated by emulsion polymerization of monomers in the presence of an anionic surfactant, a nonionic surfactant, and a nonionic surfactant with chain transfer characteristics to form toner sized aggregates;

(ii) coalescing or fusing said aggregates; and optionally (iii) isolating, washing, and drying the resulting toner.

2. A process in accordance with claim 1 wherein said nonionic surfactant with chain transfer characteristics is an adduct of ethylene oxide and dodecyl mercaptan.

3. A process in accordance with claim 2 wherein said adduct is a polyethylene tertiary thioether, a polyethylene thioester, or an ethoxylated thiol.

4. A process in accordance with claim 1 wherein said nonionic surfactant with chain transfer characteristics is a polyethylene tertiary thioether of the formula $C_{11}H_{25}C-S-CH_2-O-(CH_2CH_2O)_nH$ wherein n represents the number of segments, and is a number of from about 10 to about 40; ethoxylated dodecyl mercaptan with the formula $HS-C_{11}H_{22}-O-(CH_2CH_2O)_mH$ wherein m is a number of from about 20 to about 50; or polyethylene thioesters of the formula $CH_3-O-(CH_2CH_2O)_k-COOCH_2-SH$ wherein k is from about 10 to about 40, and wherein each surfactant is present in an amount of from about 0.1 to about 10 percent by weight of the monomers selected for the preparation of the latex polymer.

5. A process in accordance with claim 1 wherein said nonionic surfactant with chain transfer characteristics is covalently bonded to the surface of the latex.

* * * * *